United States Patent
Hu et al.

(10) Patent No.: US 11,900,682 B2
(45) Date of Patent: Feb. 13, 2024

(54) METHOD AND APPARATUS FOR VIDEO CLIP EXTRACTION, AND STORAGE MEDIUM

(71) Applicant: BEIJING XIAOMI PINECONE ELECTRONICS CO., LTD., Beijing (CN)

(72) Inventors: Jiagao Hu, Beijing (CN); Fei Wang, Beijing (CN); Pengfei Yu, Beijing (CN); Daiguo Zhou, Beijing (CN)

(73) Assignee: BEIJING XIAOMI PINECONE ELECTRONICS CO., LTD., Beijing (CN)

( * ) Notice: Subject to any disclaimer, the term of this patent is extended or adjusted under 35 U.S.C. 154(b) by 417 days.

(21) Appl. No.: 17/240,202

(22) Filed: Apr. 26, 2021

(65) Prior Publication Data

US 2022/0067383 A1 Mar. 3, 2022

(30) Foreign Application Priority Data

Aug. 25, 2020 (CN) .......................... 202010866476.9

(51) Int. Cl.
*G06V 20/40* (2022.01)
*G06N 3/08* (2023.01)
(Continued)

(52) U.S. Cl.
CPC ............ *G06V 20/49* (2022.01); *G06F 18/214* (2023.01); *G06F 18/217* (2023.01); *G06N 3/045* (2023.01);
(Continued)

(58) Field of Classification Search
CPC .... G06V 20/49; G06V 10/774; G06V 10/806; G06V 20/41; G06V 20/46; G06V 20/40;
(Continued)

(56) References Cited

U.S. PATENT DOCUMENTS

| 10,803,318 | B1 * | 10/2020 | Chen ................ G06V 30/19173 |
| 2013/0089304 | A1 * | 4/2013 | Jiang ...................... G06V 20/41 386/285 |

(Continued)

FOREIGN PATENT DOCUMENTS

| CN | 110996169 A | * | 4/2020 | .......... H04N 17/004 |
| CN | 110996169 A | | 4/2020 | |

(Continued)

OTHER PUBLICATIONS

Indian Patent Application No. 202144019299 Office Action dated Apr. 11, 2022, 7 pages.
(Continued)

*Primary Examiner* — Juan A Torres
(74) *Attorney, Agent, or Firm* — COZEN O'CONNOR (57) ABSTRACT

A method for video clip extraction includes: obtaining a video, and sampling the video to obtain N video frames, wherein N is a positive integer; inputting the N video frames to a pre-trained frame feature extraction model to obtain a feature vector of each video frame in N video frames; determining scores of the N video frames based on a pre-trained scoring model; and extracting target video clips from the video based on the scores of the N video frames.

17 Claims, 3 Drawing Sheets

(51) Int. Cl.
*G06F 18/214* (2023.01)
*G06F 18/21* (2023.01)
*G06N 3/045* (2023.01)
*G06V 10/774* (2022.01)
*G06V 10/80* (2022.01)

(52) U.S. Cl.
CPC ............. *G06N 3/08* (2013.01); *G06V 10/774* (2022.01); *G06V 10/806* (2022.01); *G06V 20/41* (2022.01); *G06V 20/46* (2022.01)

(58) Field of Classification Search
CPC ..... G06V 20/47; G06F 18/214; G06F 18/217; G06F 18/253; G06N 3/045; G06N 3/08; G06N 20/00; H04N 21/8549; H04N 21/845
USPC .......................................................... 382/157
See application file for complete search history.

(56) References Cited

U.S. PATENT DOCUMENTS

| | | | |
|---|---|---|---|
| 2014/0037215 A1* | 2/2014 | Kumar | ................... G06V 20/47 382/197 |
| 2016/0292510 A1* | 10/2016 | Han | ........................ G11B 27/28 |
| 2016/0379055 A1* | 12/2016 | Loui | ................... G06F 18/2323 382/103 |
| 2018/0173955 A1* | 6/2018 | Mehrseresht | ..... G06F 18/24137 |

FOREIGN PATENT DOCUMENTS

| | | |
|---|---|---|
| JP | 2017225174 A | 12/2017 |
| KR | 20200015610 A | 2/2020 |
| WO | WO 2020024958 A1 | 2/2020 |

OTHER PUBLICATIONS

Japanese Patent Application No. 2021-074892 Office Action dated Jun. 14, 2022, 4 pages.
Japanese Patent Application No. 2021-074892 English translation of Office Action dated Jun. 14, 2022, 4 pages.
Korean Patent Application No. 10-2021-0056620, Office Action dated Jul. 1, 2022, 4 pages.
Korean Patent Application No. 10-2021-0056620, English translation of Office Action dated Jul. 1, 2022, 5 pages.
Yao, T. et al. "Highlight Detection with Pairwise Deep Ranking for First-Person Video Summarization" Jun. 2016; CVPR; 2016, 9 pages.
European Patent Application No. 21171229.4 extended Search and Opinion dated Oct. 25, 2021, 10 pages.

* cited by examiner

METHOD AND APPARATUS FOR VIDEO CLIP EXTRACTION, AND STORAGE MEDIUM

CROSS REFERENCE TO RELATED APPLICATIONS

This application claims priority to Chinese Patent Application No. 202010866476.9, filed on Aug. 25, 2020, the content of which is incorporated herein by reference in its entirety.

TECHNICAL FIELD

The present disclosure relates to a field of video processing technology, and particularly to a method and a device for video clip extraction, and a storage medium.

BACKGROUND

A video clip extraction may be understood as an extraction of any one or more short video clips from a video. For example, a highlight video clip is extracted in a video, i.e., one or more video clips are extracted from the video, the content of which is more highlight than the contents of other video clips.

In the related art, the video clip extraction process of a video needs to completely obtain the video at the start of the process before it is divided into multiple video clips according to the content of the video. Then, each video clip is scored and the video clip is extracted based on the score of each video clip. However, extracting video clips by this method requires a large amount of calculation to determine the score of each video clip, which leads to a long extraction duration and affects the user experience.

SUMMARY

According to a first aspect of embodiments of the present disclosure, a method for video clip exaction includes: obtaining a video, and sampling the video to obtain N video frames, wherein N is a positive integer; inputting the N video frames to a pre-trained frame feature extraction model to obtain a feature vector of each video frame in the N video frames; determining scores of the N video frames based on the pre-trained scoring model, wherein, for an i-th frame in the N video frames, feature vectors of K video frames centered on the i-th frame are input to the pre-trained scoring model, to obtain a score of the i-th frame, wherein i is a positive integer less than or equal to N, and K is a positive integer; and extracting target video clips from the video based on the scores of the N video frames.

According to a second aspect of embodiments of the present disclosure, a device for video clip exaction includes a processor and a memory for storing instructions executable by the processor. The processor is configured to obtain a video, and sample the video to obtain N video frames, wherein N is a positive integer. The processor is configured to input the N video frames to a pre-trained frame feature extraction model to obtain a feature vector of each video frame in the N video frames. The processor is configured to determine scores of the N video frames based on the pre-trained scoring model, wherein, for an i-th frame in the N video frames, feature vectors of K video frames centered on the i-th frame are input to the pre-trained scoring model, to obtain a score of the i-th frame, wherein i is a positive integer less than or equal to N, and K is a positive integer. The processor is configured to extract target video clips from the video based on the scores of the N video frames.

According to a third aspect of embodiments of the present disclosure, a non-transitory computer-readable storage medium having computer instructions stored thereon is provided. When the instructions are executed by a processor, a method for video clip exaction is executed. The method includes: obtaining a video, and sampling the video to obtain N video frames, wherein N is a positive integer; inputting the N video frames to a pre-trained frame feature extraction model to obtain a feature vector of each video frame in the N video frames; determining scores of the N video frames based on the pre-trained scoring model, wherein, for an i-th frame in the N video frames, feature vectors of K video frames centered on the i-th frame are input to the pre-trained scoring model, to obtain a score of the i-th frame, wherein i is a positive integer less than or equal to N, and K is a positive integer; and extracting target video clips from the video based on the scores of the N video frames.

It is to be understood that both the foregoing general description and the following detailed description are exemplary and explanatory only and are not restrictive of the disclosure, as claimed.

BRIEF DESCRIPTION OF THE DRAWINGS

The accompanying drawings herein are incorporated into the specification and constitute a part of the specification, show embodiments in conformity with embodiments of the present disclosure, and explain the principle of the present disclosure together with the specification.

DETAILED DESCRIPTION

Exemplary embodiments will be described in detail below, examples of which are illustrated in the accompanying drawings. When the following description refers to the accompanying drawings, unless otherwise indicated, the same numbers in different drawings represent the same or similar elements. The implementations described in the following exemplary embodiments do not represent all implementations consistent with the present disclosure. On the contrary, they are only examples of apparatuses and methods consistent with some aspects of the present disclosure.

A method for video clip extraction according to the embodiments of the present disclosure is applicable to a scene where a target video clip is extracted, for example, a scene where a highlight video clip is extracted, for another example, a scene where highlight video clips of user videos may be generated as a preview in mobile phone album to show to the users, or a scene where highlight video clips of small videos may be obtained to generate gif images in a small video application as a video cover to the users, or a scene where the highlight degree of a video that a user watches online at each moment may be calculated in the background while playing the video, and highlight video clips in the video will pop up for the user to review highlight moments after the user has watched the video.

In the related art, the video clip extraction on a video needs to completely obtain a video offline, divide the video into multiple video clips according to the content of the video, extract a video feature of each video clip, and calculate a score of highlight degree of each video clip. Therefore, the video clips to be extracted are determined. When video clips are extracted by this method, it is necessary to completely obtain the video before the extraction operation is performed. In addition, when the video clip features of video clips are extracted one by one, a large number of calculations are required for determination with a long time and the desired video clip cannot be quickly obtained, thereby affecting the user experience.

To overcome the problem existed in the related art, a method and an apparatus for video clip extraction, and a storage medium are provided in the present disclosure.

In view of this, a method for video clip exaction is provided in the embodiments of the present disclosure. When a video clip extraction model used in the method for video clip exaction performs training, the training may be performed based on frame feature vectors, thereby contributing to the reduction of calculation workload of the scoring model and improving the scoring rate. Furthermore, since the model has a small calculation workload, it is helpful to be deployed in terminals such as mobile phones, tablets, and computers, which is convenient for users to use at any time.

In the method for video clip extraction according to the present disclosure, feature vectors of the sampled video frames may be inputted into the scoring model to obtain a score of each video frame, and target video clips are extracted based on the score of each video frame. The adopted scoring model is obtained by training based on frame feature vectors. The scoring model has a simple structure and small calculation workload, which contributes to quickly outputting the score of each video frame. According to the score of each video frame, target video clips can be quickly extracted in a short time and the extraction process may be shortened, which is convenient to improve the user experience.

Figure 1:
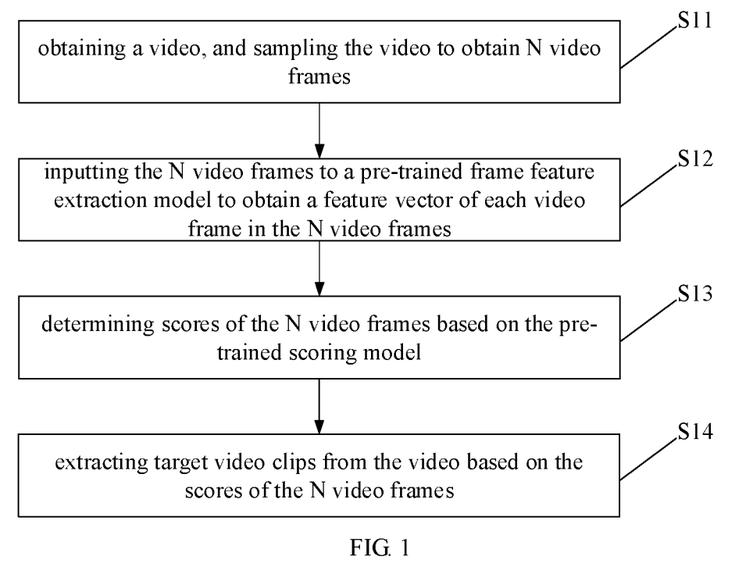
FIG. 1 is a flow chart illustrating a method for video clip exaction according to an embodiment of the present disclosure.

FIG. 1 is a flow chart illustrating a method for video clip exaction according to an embodiment of the present disclosure. As illustrated in FIG. 1, the method for video clip exaction includes the following block S11 to block S14.

In block S11, a video is obtained, and the video is sampled to obtain N video frames.

For videos with different durations, the number of sample video frames can be different. In the embodiments of the present disclosure, the sampling for the video frame may have various forms.

In an embodiment, the sampling for the video frame may be in a form of an equivalent-time sampling through a preset time ladder, in which there is no need to consider the total duration of the video, the sampling is performed only according to the time interval, which contributes to simplifying the sampling algorithm and facilitating sampling rate of the video frames. For example, the video frames in the obtained video are sampled through the preset time ladder (sampled at the $2^{nd}$, the $4^{th}$, the $6^{th}$, the $8^{th}$ second, and the like), i.e., the video frames are sampled every 2 seconds until proceeding to the end of the video. If the video has 10 seconds, 5 video frames are obtained. In an embodiment, when the video is not completely loaded, the currently loaded video can be sampled, and scores of the video at respective moments can be calculated with only a few frames of delay during the video loading process. There is no need to wait until the video is fully obtained, which contributes to online quasi-real-time calculations, thereby shortening the process of extracting target video clips and improving the user experience.

In another embodiment, the sampling for the video frame may be in a form of sampling the video frame through a designated preset number of video frames, which contributes to saving the extracting time of feature vector when the feature vector of video frame is calculated, facilitating the calculation of the feature extraction model and the process of extracting the target video clips. In an embodiment, the video can be sampled uniformly according to the designated number of video frames, which is convenient to distinguish the video content corresponding to each moment, and quickly extract target video clips based on the scores of video frames. For example, when it is necessary to obtain 5 video frames, a video with 10 seconds can be sampled every 2 seconds and a video with 15 seconds can be sampled every 3 seconds.

In block S12, the N video frames are input to a pre-trained frame feature extraction model to obtain a feature vector of each video frame in the N video frames.

In the embodiments of the present disclosure, the obtained N video frames are respectively input into the trained frame feature extraction model to obtain the feature vector corresponding to each video frame, so that the scoring model is enabled to score based on the feature vector of each video frame, the score of each video frame corresponding to each moment in the video are evaluated, and the target video clips needed by the user are extracted. The frame feature model can be a standard convolutional neural network (CNN) or an online video understanding model, such as a Temporal Shift Module for Efficient Video Understanding (TSM). When a trained CNN is used for frame feature extraction, the output vectors of a previous layer for the network classification layer can be used as the frame feature vectors of the video frames for input. When the trained online TSM is used for frame feature extraction, the output of a last layer of the backbone can be used as the feature vector, which is not limited in this disclosure.

In block S13, scores of the N video frames are determined based on a pre-trained scoring model.

In the embodiments of the present disclosure, the frame feature vectors of the N video frames are obtained with the trained scoring model and input into the scoring model, and the score of each video frame is obtained. The scoring may be performed by the scoring model based on the highlight degree of the image content of each video frame. For different video frames of the same video, the higher score output by the scoring model, the more highlight the content is. The relative size of scores can be characterized as the differences among relative highlight degrees for the contents of video frames. By obtaining the score of each video frame, the relative highlight degrees among the contents of video frames can be intuitively distinguished, and the target video clips needed by the user can be quickly extracted.

In the present disclosure, the score of each video frame is obtained through the trained scoring model based on a fusion feature vector of multiple video frames obtained around a center of the current moment corresponding to the video frame. When the score of the i-th frame is calculated in the N video frames, multiple video frames (e.g., K video frames) are obtained at moments before and after the i-th frame based on the moment position corresponding to the i-th frame in the video, and the score output based on the fusion feature vector of the K video frames is determined as the score of the current i-th frame, in which, i is a positive integer less than or equal to N, and K is a positive integer. When the score of the current video frame is calculated, combining the frame feature vectors of video frames surrounding to the current video frame helps to get a more accurate score. Therefore, when the target video clips are extracted according to the obtained scores, the contents of the target video clips are consistent with the contents corresponding to the scores, thereby helping to avoid the possibility of false extraction or incomplete extraction of the target video clips. For example, the content of the current video frame in the video belongs to an ordinary video clip, and there are highlight video clips before and after the moment corresponding to the current video frame, i.e., the moment is only a momentary transition. The score of the current video frame is calculated in conjunction with the video frames extracted before and after the current video frame, which is convenient to avoid the possibility of incomplete extraction of the target video clips. In an embodiment, in order to obtain a more accurate score, a same number of video frames can be obtained at the moments before and after the moment for the i-th frame. For example, [i−(K/2)] video frames can be obtained at the moment before the moment for the i-th frame, [i+(K/2)−1] video frames can be obtained at the moment after the moment for the i-th frame, and uniform sampling is performed, thus the score obtained is more suitable for the score of the video clip where the current video frame is located, which is more accurate and easier to eliminate abnormal data. In another embodiment, when the i-th frame belongs to the first frame of the video, the feature vector of [i−(K/2)] video frames before the first frame can be defaulted to be 0 or the same as that of [i+(K/2)−1] video frames obtained after the first frame, which contributes to the smooth operation for scoring of video frames and the evaluation frame by frame.

In block S14, target video clips are extracted from the video based on the scores of N video frames.

In the embodiments of the present disclosure, according to the needs of the user, target video clips needed by the user are extracted based on the obtained score of each video frame.

In the embodiments of the present disclosure, there are target video clips to be extracted and non-target video clips to be extracted in a video. The target video clips have attributes of target video clips, and the non-target video clips also have attributes of non-target video clips. For example, when the target video clips are highlight video clips, the video has the relatively most highlight video clips and the relatively least highlight video clips. Different target video clips are required for different users. In order to quickly extract target video clips required by the user based on the obtained video, sampling may be performed on the obtained video to obtain N video frames, in which N is a positive integer. Through the scoring model, the score of each video frame can be quickly obtained, and based on the score of each video frame, the evaluation is performed to determine target video clips that need to be extracted.

Generally, target video clips may be one or more video clips in the video and have attributes of target video clips. For example, highlight video clips are one or more relatively short video clips in the video, the content of which is more exciting and more attractive than the contents of other video clips. Taking a basketball game video as an example, the video clips such as slam dunks and smashes are highlight video clips in the basketball game video, while the video clips such as ordinary dribbling are non-highlight video clips, and black screen when the camera is switched, animation, and the like are the least highlight video clips.

In the embodiments of the present disclosure, description is made by taking the target video clips being the highlight video clips as an example. Highlight video clips are extracted from multiple video frames in the video based on the scores. Since when a score of a video frame is calculated and evaluated in combination with video frames at the moments surrounding to the video frame, the score obtained can represent average highlight degree of video clips in a range before and after the video frame. Furthermore, comparing with the calculation workload for calculating the scores of the whole video clip, determining the highlight degree of extracted target video frames based on the scores of video frames has a small calculation workload, which contributes to a quick evaluation in a short time and providing suitable target video clips. For example, when the user needs the most highlight video clip in the video, the video clip where the video frame with a highest score is located can be used as the target video clip according to the scores of video frames. In an embodiment, when the user needs multiple highlight video frame clips, the video frames can be ranked based on the corresponding scores, and the video clip where multiple video frames with relatively high scores are located is used as the target video clips.

Through the embodiments, the sample video frames take the place of video clips to be scored by the trained scoring model, which can effectively reduce the calculation workload of the scoring model, accelerate the calculation rate of scoring, improve the process of extracting target video clips, and is convenient to improve the user experience.

In an embodiment, the target video clips may be extracted by sliding a fixed-length sliding window on the video along a time sequence, where the range covered by the sliding window for each slide is a video clip. That is, when the sliding window performs each slide from the end position of the sliding window to the start position of the sliding window, a video clip is generated. For each sliding window, an average score is obtained according to the scores of video frames included within the sliding window, and the average score is regarded as the score of video clip corresponding to the sliding window. Therefore, according to the needs of the user, one or more target video clips are extracted from multiple video clips based on the scores of multiple video clips. Taking the acquisition of highlight video clips as an example, a fixed-length sliding window is used to slide on the video along the time sequence, and the average value of the scores of highlight degree of all video frames within the window is calculated as the score of highlight degree of the video clip corresponding to the window. The video clip corresponding to the sliding window with the highest score is the highlight clip of the video. When multiple highlight clips are need to be extracted, video clips with relatively high scores can be extracted according to the score corresponding to each sliding window. In order to avoid a high overlapping degree between the video clips, a non-maximum mechanism algorithm can be used to eliminate the video clip corresponding to the sliding window with a high overlapping degree before extracting the video clips, and the extracted video clips can be scattered from each other, which is convenient to improve the user's experience when watching the extracted video clips.

Training data for the scoring model in the embodiments of the present disclosure is obtained by using data pairs composed of positive clips and negative clips via a multi-frame fusion layer.

In an embodiment, the scoring model is trained based on a multi-frame fusion layer and data pairs composed of positive clips and negative clips. The data pairs composed of positive clips and negative clips are obtained based on a sample video clip labelled with target attributes. The target attributes include attributes that characterize a video clip is a target video clip or a non-target video clip. The multi-frame fusion layer is configured to fuse feature vectors of K video frames into a fixed-length vector.

Figure 2:
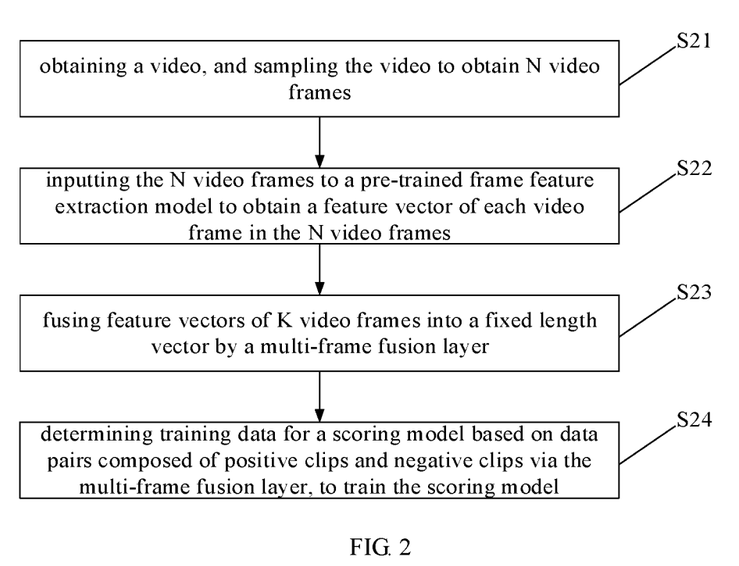
FIG. 2 is a flow chart illustrating a method for training a scoring model according to an embodiment of the present disclosure.

FIG. 2 is a flow chart illustrating a method for training a scoring model according to an embodiment of the present disclosure. As illustrated in FIG. 2, the method for training a scoring model includes the following block S21 to block S24.

In block S21, a video is obtained, and the video is sampled to obtain N video frames.

In block S22, the N video frames are input to a pre-trained frame feature extraction model to obtain a feature vector of each video frame in the N video frames.

In block S23, it is determined that feature vectors of K video frames are fused into a fixed-length vector by a multi-frame fusion layer.

In the embodiments of the present disclosure, description is made by taking the target video clip being the highlight video clip as an example. In order to correspond a score of a video frame obtained by the scoring model to highlight degrees of the video clip content where the video frame is located, it is necessary to obtain feature vectors of (K−1) video frames centered on the i-th frame at the same time when a feature vector of an i-th frame is obtained, which is convenient to improve the reliability of the output score. Therefore, before training the scoring model, it is necessary to determine that feature vectors of K video frames may be fused into a fixed-length vector by the multi-frame fusion layer, so that the length vector output by the multi-frame fusion layer may enter the scoring model for scoring. For example, a video frame corresponds to an N-dimensional vector, and 7 N-dimensional vectors are obtained when 7 video frames are obtained simultaneously. Therefore, in order to ensure the normal operation of the scoring model and the reliability of the scores, it is necessary to fuse the obtained 7 N-dimensional vectors by the multi-frame fusion layer to obtain an M-dimensional vector suitable as an input of the scoring model. The multi-frame fusion layer can fuse multiple N-dimensional vectors to a fixed-length vector in manners such as connecting in series, pooling or adding vectors.

In block S24, training data for a scoring model is determined based on data pairs composed of positive clips and negative clips via the multi-frame fusion layer, to train the scoring model.

In the embodiments of the present disclosure, the training data for the scoring model is determined based on the data pairs composed of positive clips and negative clips via the multi-frame fusion layer, to train the scoring model. In the process of obtaining data pairs, the obtained video clip is labelled based on the content of the video clip, and then it is determined whether the labelled video clip is a positive clip or a negative clip. Target attributes include attributes that characterize a video clip is a target video clip or a non-target video clip. In an embodiment, the target video clip may be the most highlight video clip in the video; the non-target video clip may be the least highlight video clip in the video. Therefore, when the data pairs are obtained, the differences between the positive clips and the negative clips can be clearly distinguished, so that the scoring model can quickly learn the video clip features with different attributes when the scoring model is trained. Further, based on the attribute label of the labelled video clip, the accuracy of the training data can be improved, and the interference of noisy data on model training can be reduced, thereby improving the cleanliness of the training data and making the structure of the training model simpler. Thus, it is unnecessary to calculate the reliability of the labelled video clip with an additional network model, which is convenient to accelerate the convergence of the training process of the scoring model and save costs.

In another embodiment, training the scoring model includes: sampling K video frames in the positive clips, feature vectors of K video frames sampled in the positive clips being extracted based on the frame feature extraction model, and sampling K video frames in the negative clips, feature vectors of K video frames sampled in the negative clips being extracted based on the frame feature extraction model, fusing the feature vectors of K video frames sampled in the positive clips to fixed-length positive clip feature vectors based on the multi-frame fusion layer, and fusing the feature vectors of K video frames sampled in the negative clips to fixed-length negative clip feature vectors based on the multi-frame fusion layer; and inputting the positive clips feature vectors and the negative clips feature vectors to a twin neural network, to obtain the scores of the positive clips and the scores of the negative clips, and performing back propagation with a ranking loss to obtain a trained twin neural network; wherein the twin neural network includes two multi-layer perceptron models with shared parameters; the scoring model being a multi-layer perceptron model of the trained twin neural network.

Figure 3:
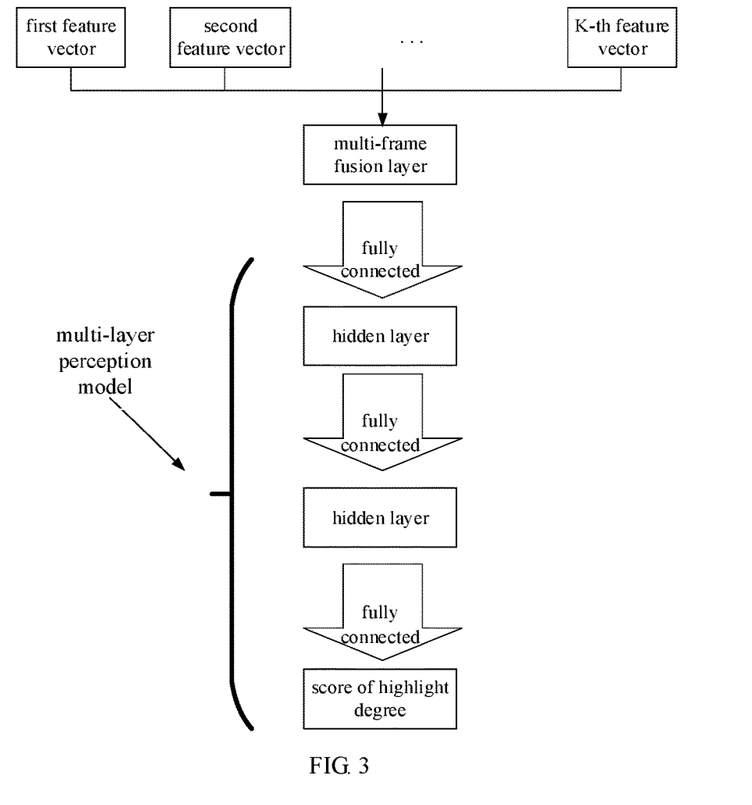
FIG. 3 is a schematic diagram illustrating another method for training a scoring model according to an embodiment of the present disclosure.

In an implementation scenario, in the process of determining the training data for the scoring model, K video frames are randomly sampled or uniformly sampled in the positive clip. Furthermore, as illustrated in FIG. 3, frame feature vectors of the obtained K video frames are extracted by the frame feature extraction model, and the frame feature vectors corresponding to video frames in the positive clip are obtained. Furthermore, the obtained K frame feature vectors are fused by a multi-frame fusion layer, to obtain a fixed-length positive clip feature vector, which is recorded as $\{P_1, P_2, K\, P_k\}$. In addition, K video frames are randomly sampled or uniformly sampled in the negative clip. Furthermore, frame feature vectors of the obtained K video frames are extracted by the frame feature extraction model, to obtain the frame feature vector corresponding to video frames in the positive clip. Furthermore, the obtained K frame feature vectors are fused by a multi-frame fusion layer, to obtain a fixed-length negative clip feature vector, which is recorded as $\{N_1, N_2, K, N_K\}$.

The scoring model can be obtained from a multi-layer perceptron model. By copying a multi-layer perceptron model with sharing parameters, a twin neural network is obtained. Through training the twin neural network, a trained scoring model is obtained. When the obtained positive clip feature vector and the negative clips feature vector are input into the twin neural network for training, the obtained positive clip feature vector and the negative clip feature vectors can be input at the same time to obtain the score of the positive clip and the score of the negative clip. The loss values are calculated according to the scores of the positive clips and the scores of the negative clips, and the twin neural network is trained through a back-propagation algorithm. During the training, the feature vector $\{P_1, P_2, K\ P_k\}$ of the positive clip and the feature vector $\{N_1, N_2, K, N_K\}$ of the negative clip in each data pair are input into the twin neural network to obtain the score s(P) of the positive clip and the score S(N) of the negative clip. The output score corresponding to the positive clip should be larger than the output score corresponding to the negative clip. Furthermore, a ranking loss function is used to perform back propagation on the scores output from the scoring model, to adjust the parameters and weight ratios in the twin neural network, thereby improving the accuracy of the scoring model and accelerating the convergence rate of the twin neural network during the training process. The ranking loss function can be recorded in the following form: $L(\{P_1, P_2, K\ P_k\}, \{N_1, N_2, K, N_K\})=\max(0,1-S(P)+S(N))$.

In the embodiments of the present disclosure, the training process of the scoring model will be illustrated with examples in combination with practical applications.

Before training the scoring model, data pairs suitable for training the scoring model are obtained in advance, so that the scoring model can distinguish the differences among the highlight degrees for different video contents when the scoring model is trained, so as to improve the accuracy of the scoring. Furthermore, data pairs used for training are obtained based on the labelled clips of the labelled target attributes in the sample video, which is convenient to avoid the mixing of noisy data and improve the quality of training data, further to reduce the training difficulty and accelerating the training process.

In another embodiment, obtaining the data pairs composed of positive clips and negative clips based on a sample video clip labelled with target attributes includes: obtaining a sample video including one or more sample video clips; and obtaining the data pairs composed of positive clips and negative clips based on target attributes labelled by the one or more sample video clips, and non-sample video clips included in the sample video, wherein a possibility of becoming a target video clip for a positive clip is greater than a possibility of becoming a target video clip for a negative clip.

In another embodiment, obtaining data pairs composed of positive clips and negative clips based on target attributes labelled by the one or more sample video clips, and non-sample video clips included in the sample video, includes: when target attributes labelled by the one or more sample video clips include attributes that characterize a video clip is a target video clip, regarding the one or more sample video clips as positive clips, extracting a part of video clips from the non-sample video clips included in the sample video as negative clips, and obtaining one or more data pairs from the positive clips and the negative clips; or when the target attributes labelled by the one or more sample video clips include attributes that characterize a video clip is a non-target video clip, regarding the one or more sample video clips as negative clips, extracting a part of video clips from the non-sample video clips included in the sample video as positive clips, and obtaining one or more data pairs from the positive clips and the negative clips; or when target attributes labelled by the one or more sample video clips include attributes that characterize a video clip is a target video clip and attributes that characterize a video clip is a non-target video clip, regarding the sample video clips that are labelled with the attributes that characterize a target video clip as positive clips, regarding the sample video clips that are labelled with the attributes that characterize a non-target video clip as negative clips, extracting a part of video clips from the non-sample video clips included in the sample video clips, obtaining data pairs from the positive clips and the negative clips, obtaining data pairs from the positive clips and the part of video clips, and obtaining data pairs from the negative clips and the part of video clips.

In another embodiment, extracting target video clips from the video based on scores of the N video frames, includes: obtaining multiple video clips by sliding a fixed-length sliding window along the time sequence on the video, wherein each sliding window corresponds to a video clip; for each sliding window, determining an average score of video frames included in each sliding window, and determining the average score of the video frames as a score of the video clip corresponding to the sliding window; and extracting one or more target video clips from the multiple video clips based on the scores of the multiple video clips.

Figure 4:
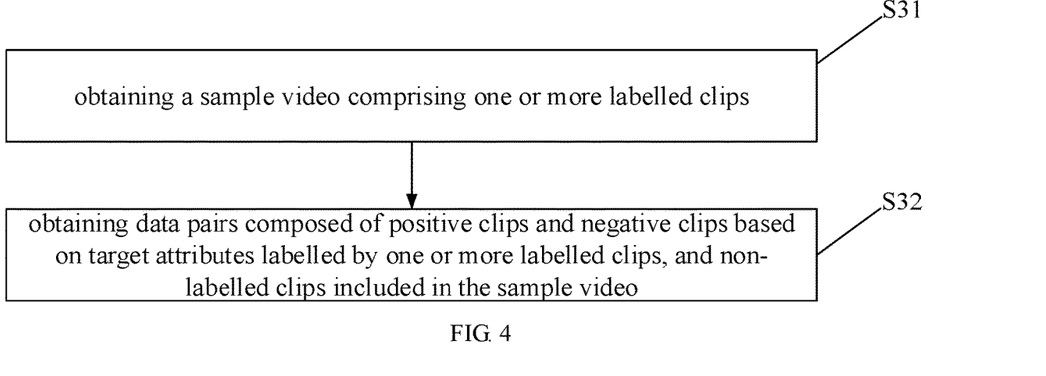
FIG. 4 is a flow chart illustrating a method for determining a data pair according to an embodiment of the present disclosure.

FIG. 4 is a flow chart illustrating a method for determining a data pair according to an embodiment of the present disclosure. As illustrated in FIG. 4, the method for determining a data pair includes the following block S31 to block S32.

In block S31, a sample video including one or more labelled video clips is obtained.

In an embodiment, before training the scoring model, a certain number of sample videos is obtained in advance to obtain a set of sample videos, so that the scoring model has sufficient training data for training.

In block S32, data pairs composed of positive clips and negative clips are obtained based on target attributes labelled by one or more labelled video clips, and unlabeled video clips included in the sample video.

In the set of sample videos, each sample video has one or more of labelled video clips and unlabeled video clips. The labelled video clips in each sample video are labelled based on the content to clarify the target attributes of each labelled video clip. Based on the labelled target attributes, the data pairs composed of positive clips and negative clips are obtained from respective labelled video clips and respective unlabeled video clips. A possibility of a positive clip becoming a target video clip is larger than a possibility of a negative clip becoming a target video clip. Based on the differences between the positive clips and the negative clips, the scoring model can accurately distinguish the feature differences among the labeled video clips and the unlabeled video clips, which is convenient to improve the accuracy of the scoring model.

In an embodiment, in order to enable the scoring model to better distinguish the differences among the highlight degrees for different video clips in the same video, when a data pair is obtained, the positive clip and the negative clip can be from the same sample video, so that the relative score differences among the video clips can be obtained, and the highlight degrees for the video clips are distinguished in the same video, which is convenient to make full use of the sample video. For example, for a set of dunk highlight videos, every dunk video clip is a highlight video clip. The relative size among the scores of respective dunk video clips can be obtained with the scoring model that is trained by using the data pairs obtained from positive clips and negative clips of the same sample video, so that more relatively highlight dunk video clips are distinguished, thereby facilitating the extraction of the target video.

In the embodiments of the present disclosure, description is made by taking the target video clip being a highlight video clip as an example.

When a video clip in a sample video is labelled with target attributes that are target video clip attributes, the most highlight video clip in the sample video is regarded as the video clip with the target video clip attributes according to the content of the sample video (that is, the content of said video clip is more exciting and attractive than other contents at other moments in the same video), then the start and end moments of said video clip are labelled to obtain a labelled video clip with the target video clip attribute. When a video clip in the sample video is labelled with non-target attributes that are non-target video clip attributes, the least highlight video clip in the sample video is regarded as the video clip with non-target video clip attributes according to the content of the sample video (that is, said video clip is less exciting and unattractive than other contents at other moments in the same video), the start and end moments of said video clip are labelled to obtain a labelled video clip with the non-target video clip attributes.

Figure 5:
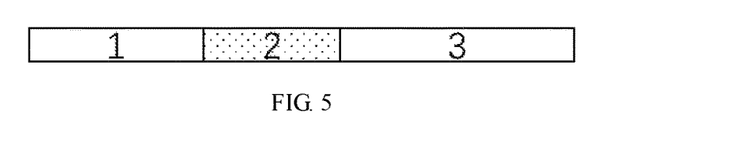
FIG. 5 is a schematic diagram illustrating a sample video label according to an embodiment of the present disclosure.

In an embodiment, the sample video may include one or more labelled video clips whose target attributes are the target video clip attributes and unlabeled video clips. When the obtaining of data pairs is performed, one or more labelled video clips can be used as positive clips, and a part of video clips can be extracted as negative clips from the unlabeled video clips included in the sample video. When there is only one labelled video clip in the sample video, and a duration of the unlabeled video clip is similar to a duration of the labelled video clip, the labelled video clip can be regarded as a positive clip and the unlabeled video clip as a negative clip to obtain the data pair needed by the training. For example, as illustrated in FIG. 5, the video clip 2 is a labelled video clip whose target attributes are the target video clip attributes, and the video clip 1 and the video clip 3 are unlabeled video clips. Furthermore, when the obtaining of data pair is performed, a data pair is obtained in which the video clip 2 is a positive clip and the video clip 1 is a negative clip, or a data pair is obtained in which the video clip 2 is a positive clip and the video clip 3 is a negative clip. When there is only one labelled video clip in the sample video, but a duration of the unlabeled video clip is too long, the unlabeled video clip can be divided into multiple unlabeled sub video clips within a specified duration, and then multiple data pairs can be obtained in which the labelled video clip is the positive clip and the unlabeled sub video clips are the negative clips. It is convenient to reduce the difficulty of labeling, and a large number of training data pairs can be obtained by labeling a small number of labelled video clips. For example, a duration of the sample video is 60 seconds, in which, a duration of the labelled video clip is 10 seconds, and a duration of the unlabeled video clip is 50 seconds. In order to obtain a large number of training data pairs, the unlabeled video clip can be divided into multiple unlabeled sub video clips whose duration is similar to that of the labelled video clip. When the unlabeled video clip is divided into multiple unlabeled sub video clips with less than 10 seconds, at least 5 unlabeled sub video clips can be obtained, for example: the unlabeled sub video clip 1, the unlabeled sub video clip 2, the unlabeled sub video clip 3, the unlabeled sub video clip 4, and the unlabeled sub video clip 5. Furthermore, 5 data pairs used for score model training can be obtained: the data pair in which the labelled video clip is the positive clip and the unlabeled sub video clip 1 is the negative clip; the data pair in which the labelled video clip is the positive clip and the unlabeled sub video clip 2 is the negative clip; the data pair in which the labelled video clip is the positive clip and the unlabeled sub video clip 3 is the negative clip; the data pair in which the labelled video clip is the positive clip and the unlabeled sub video clip 4 is the negative clip; and the data pair in which the labelled video clip is the positive clip and the unlabeled sub video clip 5 is the negative clip.

Figure 6:
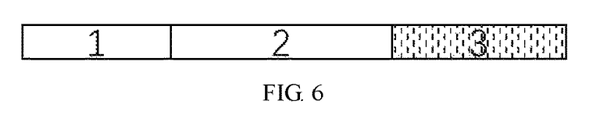
FIG. 6 is a schematic diagram illustrating another sample video label according to an embodiment of the present disclosure.

In another embodiment, the sample video may include one or more labelled video clips whose target attributes are non-target video clip attributes and unlabeled video clips. When the obtaining of data pairs is performed, one or more labelled video clips can be used as negative clips, and a part of video clips can be extracted as positive clips from the unlabeled video clips included in the sample video. When there is only one labelled video clip in the sample video, and a duration of the unlabeled video clip is similar to a duration of the labelled video clip, the labelled video clip can be regarded as a negative clip and the unlabeled video clip as a positive clip to obtain a data pair needed by the training. For example, as illustrated in FIG. 6, the video clip 3 is a labelled video clip whose target attributes are the non-target video clip attributes, and the video clip 1 and the video clip 2 are unlabeled video clips. Furthermore, when the obtaining of data pair is performed, a data pair is obtained in which the video clip 1 is a positive clip and the video clip 3 is a negative clip, or a data pair is obtained in which the video clip 2 is a positive clip and the video clip 3 is a negative clip. When there is only one labelled video clip in the sample video, but a duration of the unlabeled video clip is too long, the unlabeled video clip can be divided into multiple unlabeled sub video clips within a specified duration, and then multiple data pairs can be obtained in which the labelled video clip is the negative clip and the unlabeled sub video clips are positive clips. It is convenient to reduce the difficulty of labeling, and a large number of training data pairs can be obtained by labeling a small number of labelled video clips.

Figure 7:
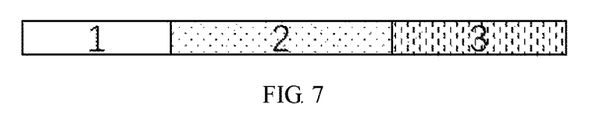
FIG. 7 is a schematic diagram illustrating yet another sample video label according to an embodiment of the present disclosure.

In another embodiment, the sample video may include one or more labelled video clips whose target attributes are the target video clip attributes, one or more labelled video clips whose target attributes are the non-target video clip attributes, and unlabeled video clips. During the obtaining of data pair is performed, when the labelled video clips that are labelled with attributes that characterize a target video clip are regarded as positive clips, the labelled video clips that are labelled with attributes that characterize a non-target video clip are regarded as negative clips, or a part of video clips are extracted from the unlabeled video clips and are regarded as negative clips; when the labelled video clip are labelled with attributes that characterize a non-target video clip are regarded as negative clips, the labelled video clip that are labelled with attributes that characterize a target video clip are regarded as positive clips, or a part of video clips are extracted from the unlabeled video clips and are regarded as positive clips. For example, as illustrated in FIG. 7, the video clip 2 is a video clip labelled with the attributes that characterize a target video clip, the video clip 3 is a labelled video clip whose target attributes are the non-target video clip attributes, and the video clip 1 is an unlabeled video clip. When the obtaining of data pair is performed, a data pair may be obtained in which the video clip 2 is a positive clip and the video clip 1 is a negative clip; the data pair may be obtained in which the video clip 2 is a positive clip and the video clip 3 is a negative clip; and the data pair may be obtained in which the video clip 1 is a positive clip and the video clip 3 is a negative clip.

Obtaining the labelled training data pairs can effectively reduce the generation of noisy data and avoid the interference of noisy data, which is convenient to improve the cleanliness of training data, make the structure of the scoring model simple without using other network models or adding other parameters to improve the reliability of the training data and with a low difficulty of the training, and further to accelerate the convergence of the scoring model during the training process.

Based on the same concept, a video clip extraction device is provided in the embodiments of the present disclosure.

It can be understood that, the apparatus for video clip extraction in the embodiments of the present disclosure includes hardware structures and/or software modules corresponding to execute specific functions with the aim to realize the above functions. Combined with units and algorithm steps of examples of embodiments disclosed in this present disclosure, the embodiments may be realized in hardware or in combination of hardware and computer software. Whether some function is executed in hardware or in a manner of driving the hardware by computer software depends on specific application and design constraints of the technical solutions. Those skilled in the art may adopt different methods for each specific application to realize the described functions, but such implementation should not be considered as going beyond the scope of the technical solutions of the embodiments of the present disclosure.

Figure 8:
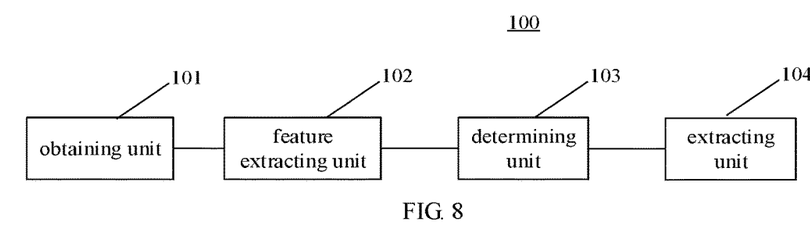
FIG. 8 is a block diagram illustrating an apparatus for video clip exaction according to an embodiment of the present disclosure.

FIG. 8 is a block diagram illustrating an apparatus for video clip exaction according to an embodiment of the present disclosure. According to FIG. 8, the video clip extraction apparatus 100 includes an obtaining unit 101, a feature extracting unit 102, a determining unit 103 and an extracting unit 104.

The obtaining unit 101 is configured to obtain a video, and sample the video to obtain N video frames, in which N is a positive integer.

The feature extracting unit 102 is configured to input the N video frames to a pre-trained frame feature extraction model to obtain a feature vector of each video frame in the N video frames.

The determining unit 103 is configured to determine scores of the N video frames based on a pre-trained scoring model, in which, for the i-th frame in the N video frames, the feature vectors of K video frames centered on i-th frame are input to the pre-trained scoring model, and a score of i-th frame is obtained, in which i is a positive integer less than or equal to N, and K is a positive integer.

The extracting unit 104 is configured to extract target video clips from the video based on the scores of N video frames.

In an embodiment, the video clip extraction apparatus further includes a training unit. The training unit is configured to obtain training data for a scoring model by using data pairs composed of positive clips and negative clips via a multi-frame fusion layer and train the scoring model with said training data. The data pairs are obtained based on a sample video clip labelled with target attributes. The target attributes includes attributes that characterize a video clip is a target video clip or a non-target video clip. The multi-frame fusion layer is configured to fuse feature vectors of K video frames into a fixed-length vector.

In another embodiment, the training unit obtains the scoring model by: sampling K video frames in the positive clip, extracting feature vectors of K video frames sampled in the positive clip based on the frame feature extraction model, and sampling K video frames in the negative clip, extracting feature vectors of K video frames sampled in the negative clip based on the frame feature extraction model, fusing the feature vectors of K video frames sampled in the positive clip to a fixed-length positive clip feature vector based on the multi-frame fusion layer, and fusing the K video frames sampled in the negative clip to a fixed-length negative clip feature vector based on the multi-frame fusion layer; and inputting the fixed-length positive clips feature vector and the fixed-length negative clips feature vector to a twin neural network, to obtain the score of the positive clip and the score of the negative clip, and performing back propagation with a ranking loss to obtain a trained twin neural network; in which the twin neural network includes two multi-layer perceptron models with shared parameters; the scoring model being a multi-layer perceptron model of the trained twin neural network.

In another embodiment, obtaining the data pairs includes: obtaining a sample video including one or more sample video clips; and obtaining data pairs composed of positive clips and negative clips based on target attributes labelled by one or more sample video clips, and non-sample video clips included in sample video, in which a possibility of becoming a target video clip for a positive clip is greater than a possibility of becoming a target video clip for a negative clip.

In another embodiment, obtaining the data pairs composed of positive clips and negative clips based on target attributes labelled by one or more sample video clips and non-sample video clips included in the sample video, includes: when target attributes labelled by the one or more sample video clips include attributes that characterize a video clip is a target video clip, determining the one or more sample video clips as positive clips, extracting a part of video clips from the non-sample video clips included in the sample video as negative clips, and obtaining one or more data pairs from the positive clips and the negative clips; or when the target attributes labelled by the one or more sample video clips include attributes that characterize a video clip is a non-target video clip, determining the one or more sample video clips as negative clips, extracting a part of video clips from the non-sample video clips included in the sample video as positive clips, and obtaining one or more data pairs from the positive clips and the negative clips; or when target attributes labelled by the one or more sample video clips include attributes that characterize a video clip is a target video clip and attributes that characterize a video clip is a non-target video clip, determining the sample video clips that are labelled with the attributes that characterize a target video clip as positive clips, determining the sample video clips that are labelled with the attributes that characterize a non-target video clip as negative clips, extracting a part of video clips from the non-sample video clips included in the sample video clips, obtaining data pairs from the positive clips and the negative clips, obtaining data pairs from the positive clips and the part of video clips, and obtaining data pairs from the negative clips and the part of video clips.

In another embodiment, the extraction module extracts target video clips from the video based on the scores of the N video frames in a method of: obtaining multiple video clips by sliding a fixed-length sliding window along the time sequence on the video, in which each sliding window corresponds to a video clip; for each sliding window, determining the average score of video frames included in each sliding window, and determining an average score of video frames as a score of the video clip corresponding to the sliding window; and extracting one or more target video clips from multiple video clips based on the scores of the multiple video clips.

Regarding to the apparatuses in the above embodiments, the specific implementations for each of the modules have been described in detail in the embodiments of the method, which will not be elaborated here.

Figure 9:
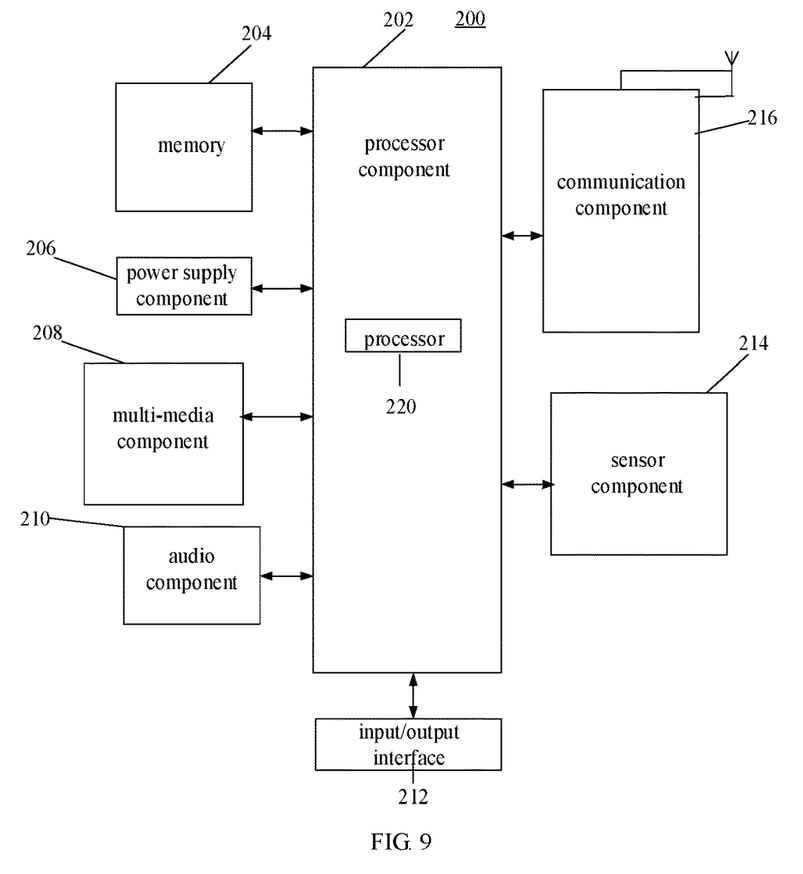
FIG. 9 is a block diagram illustrating another apparatus for video clip exaction according to an embodiment of the present disclosure.

FIG. 9 is a block diagram illustrating another apparatus for video clip exaction according to an embodiment of the present disclosure. For example, the video clip extraction apparatus 200 can be a mobile phone, a computer, a digital broadcasting terminal, a messaging device, a game console, a tablet device, a medical device, a fitness device, a personal digital assistant, etc.

According to FIG. 9, the video clip extraction apparatus 200 may include one or more of the following components: a processing component 202, a memory 204, a power supply component 206, a multimedia component 208, an audio component 210, an input/output (I/O) interface 212, a sensor component 214, and a communication component 216.

The processing component 202 typically controls overall operations of the video clip extraction apparatus 200, such as the operations associated with display, telephone calls, data communications, camera operations, and recording operations. The processing component 202 may include one or more processors 220 to execute instructions to perform all or part of the steps in the above methods. In addition, the processing component 202 may include one or more modules to facilitate the interaction between the processing component 202 and other components. For example, the processing component 202 may include a multimedia module to facilitate the interaction between the multimedia component 208 and the processing component 202.

The memory 204 is configured to store various types of data to support operations on the video clip extraction apparatus 200. Examples of these data include instructions for any application or method operating on the video clip extraction apparatus 200, such as contact data, phone book data, messages, pictures, videos, and so on. The memory 204 can be implemented by any type of volatile or non-volatile storage device or their combination, such as static Random-Access Memory (SRAM), Electrically Erasable Programmable Read-Only Memory (EEPROM), Erasable and Programmable Read-Only Memory (EPROM), Programmable Read-Only Memory (PROM), Read-Only Memory (ROM), magnetic memory, flash memory, magnetic disk or optical disk.

The power supply component 206 provides power for various components of the video clip extraction apparatus 200. The power component 206 may include a power management system, one or more power supplies, and other components associated with the generation, management, and distribution of power for the video clip extraction apparatus 200.

The multimedia component 208 includes a screen that provides an output interface between the video clip extraction apparatus 200 and the user. In some embodiments, the screen may include a liquid crystal display (LCD) and a touch panel (TP). If the screen includes a touch panel, the screen may be used as a touch screen to receive input signals from the user. The touch panel includes one or more touch sensors to sense touch, slide, and gestures on the touch panel. The touch sensors may not only sense a boundary of a touch or swipe action, but also sense a period of time and a pressure associated with the touch or swipe action. In some embodiments, the multimedia component 208 includes a front camera and/or a rear camera. The front camera and/or the rear camera may receive an external multimedia datum while the video clip extraction apparatus 200 is in an operation mode, such as a photographing mode or a video mode. Each of the front camera and the rear camera may be a fixed optical lens system or have focus and optical zoom capability.

The audio component 210 is configured to output and/or input audio signals. For example, the audio component 210 includes a microphone (MIC). When the video clip extraction apparatus 200 is in an operation mode, such as a call mode, a recording mode, and a voice recognition mode, the microphone is configured to receive external audio signals. The received audio signal may be further stored in the memory 204 or transmitted via the communication component 216. In some embodiments, the audio component 210 further includes a speaker to output audio signals.

The I/O interface 212 provides an interface between the processing component 202 and the peripheral interface module. The peripheral interface module may be a keyboard, a click wheel, a button, and so on. These buttons may include but are not limited to: home button, volume button, start button, and lock button.

The sensor component 214 includes one or more sensors to provide status assessments of various aspects of the video clip extraction apparatus 200. For example, the sensor component 214 may detect the on/off state of the video clip extraction apparatus 200 and relative position of components, for example, components as the display and the keypad of the video clip extraction apparatus 200. The sensor component 214 may also detect changes of the position of the video clip extraction apparatus 200 or one component of the video clip extraction apparatus 200, and the presence or absence of contact between a user and the video clip extraction apparatus 200, the position or acceleration/deceleration of the video clip extraction apparatus 200, and the temperature change of the video clip extraction apparatus 200. The sensor component 214 may include a proximity sensor configured to detect the presence of nearby objects without any physical contact. The sensor component 214 may also include a light sensor, such as a CMOS or CCD image sensor for the imaging applications. In some embodiments, the sensor component 214 may also include an accelerometer sensor, a gyroscope sensor, a magnetic sensor, a pressure sensor, or a temperature sensor.

The communication component 216 is configured to facilitate wired or wireless communication between the video clip extraction apparatus 200 and other devices. The video clip extraction apparatus 200 may get access to a wireless network based on the communication standard, such as Wi-Fi, 2G or 3G or their combinations. In an embodiment, the communication component 216 receives a broadcast signal or broadcast associated information from an external broadcast management system via a broadcast channel. In an embodiment, the communication component 216 further includes a near field communication (NFC) module to facilitate short-range communications. For example, the NFC module can be implemented based on Radio Frequency Identification (RFID) technology, Infrared Data Association (IrDA) technology, Ultra-Wide Band (UWB) technology, Blue Tooth (BT) technology and other technologies.

In an embodiment, the video clip extraction apparatus 200 may be implemented by one or more application specific integrated circuits (ASIC), digital signal processors (DSP), digital signal processing devices (DSPD), programmable logic devices (PLD), field-programmable gate array (FPGA), controller, micro-controller, microprocessor, or other electronic components, for performing the above methods.

In an embodiment, there is also provided a non-transitory computer-readable storage medium including instructions, such as included in the memory 204, executable by the processor 220 in the video clip extraction apparatus 200, for performing the above methods. For example, the non-transitory computer-readable storage medium may be a ROM, a RAM, a CD-ROM, a magnetic tape, a floppy disc, an optical data storage device, and the like.

The technical solutions according to the embodiments of the present disclosure may include the following beneficial effects: with the method for video clip extraction according to the present disclosure, sampling extraction may be performed based on the video frames obtained in the process of online video acquisition, thereby contributing to the reduction of calculation workload of the scoring model, and facilitating the extraction rate of video clips. Based on the score of the highlight degree of the video frame, the highlight degree of parts of the video can be compared while obtaining the video frame, and after the video is completely obtained, target video clips needed by the user can be quickly extracted, which is convenient to improve the user experience.

It can be further understood that in the present disclosure, "multiple" refers to two or more than two, and other quantifiers are similar. "And/or" describes the association of the associated object, indicating that there can be three types of relations, for example, A and/or B, which means: A exists alone, A and B exist at the same time, and B exists alone. The character "/" generally indicates that the associated objects before and after are in an "or" relationship. The singular forms "a", "the" and "this" are also intended to include plural forms, unless the context clearly indicates other meanings.

It can be further understood that although the terms "first", "second", etc. may be adopted in the disclosure to describe various information, the information is not limited to these terms. These terms are only used to distinguish the same type of information from each other, and do not indicate a specific order or degree of importance. In fact, expressions such as "first" and "second" can be used interchangeably. For example, without departing from the scope of the present disclosure, first information may also be referred to as second information, and similarly, second information may also be referred to as first information.

It can be further understood that, unless otherwise specified, "connected" includes a direct connection between the two without other components, and also includes an indirect connection between the two with other elements.

It can be further understood that although the operations in the embodiments of the present disclosure are described in a specific order in the drawings, they should not be understood as requiring these operations to be performed in the specific order shown or in a serial order, or requiring to perform all the operations shown to get the desired result. In certain circumstances, multitasking and parallel processing may be favorable.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It should be understood that the present disclosure is not limited to the precise structure described above and shown in the drawings, and various modifications and changes can be made without departing from its scope. The scope of the present disclosure is only limited by the appended claims.

What is claimed is:

1. A method for video clip extraction, comprising:
   obtaining a video, and sampling the video to obtain N video frames, wherein N is a positive integer;
   inputting the N video frames to a pre-trained frame feature extraction model to obtain a feature vector of each video frame in the N video frames;
   determining scores of the N video frames based on a pre-trained scoring model, wherein, for an i-th frame in the N video frames, feature vectors of K video frames centered on the i-th frame are input to the pre-trained scoring model, to obtain a score of the i-th frame, wherein i is a positive integer less than or equal to N, and K is a positive integer; and
   extracting target video clips from the video based on the scores of the N video frames;
   wherein the method further comprises: determining training data to train the pre-trained scoring model based on data pairs composed of first clips and second clips via a multi-frame fusion layer;
   wherein the data pairs are obtained by:
   obtaining a sample video comprising one or more of labeled video clips and unlabeled video clips, wherein each labeled video clip is labeled with a target attribute for characterizing the target video clip, or a non-target attribute for characterizing the non-target video clip; and
   obtaining the data pairs composed of first clips and second clips, based on the target attributes, the non-target attributes and the unlabeled video clips.

2. The method of claim 1,
   wherein the multi-frame fusion layer is configured to fuse feature vectors of K video frames into a fixed-length vector.

3. The method of claim 2, wherein the scoring model is obtained by:
   sampling K first video frames in the first clip, extracting first feature vectors of the K first video frames based on the frame feature extraction model, and sampling K second video frames in the second clip, extracting second feature vectors of the K second video frames based on the frame feature extraction model,
   fusing the first feature vectors of K first video frames to a fixed-length first clip feature vector based on the multi-frame fusion layer, and fusing the second feature vectors of K second video frames to a fixed-length second clip feature vector based on the multi-frame fusion layer; and
   inputting the fixed-length first clip feature vector and the fixed-length second clip feature vector to a twin neural network, to obtain the score of the first clip and the score of the second clip, and performing back propagation with a ranking loss to obtain a trained twin neural network; wherein the twin neural network comprises two multi-layer perceptron models with shared parameters; the scoring model being a multi-layer perceptron model of the trained twin neural network.

4. The method of claim 1, wherein obtaining the data pairs composed of first clips and second clips based on the target attributes, the non-target attributes and the unlabeled video clips comprises:
when the labelled sample video clips are first labelled video clips with the target, determining the first labeled video clips as first clips, extracting a part of video clips from the unlabeled video clips as second clips, and obtaining one or more data pairs from the first clips and the second clips; or
when the labelled sample video clips are second labeled video clips with the non-target attributes, determining the second labeled video clips as second clips, extracting a part of video clips from the unlabeled video clips as first clips, and obtaining one or more data pairs from the first clips and the second clips; or
when the labelled video clips comprise first labelled video clips with the target attributes and second labeled video clips with the non-target attributes, determining the first labelled video clips as first clips, determining the second labeled video clips as second clips, extracting a part of video clips from the unlabeled video clips, obtaining data pairs from the first clips and the second clips, obtaining data pairs from the first clips and the part of video clips, and obtaining data pairs from the second clips and the part of video clips.

5. The method of claim 1, wherein extracting target video clips from the video based on the scores of the N video frames comprises:
obtaining multiple video clips by sliding a fixed-length sliding window along a time sequence on the video, wherein each sliding window corresponds to a video clip;
for each sliding window, determining an average score of video frames included in each sliding window, and determining the average score of the video frames as a score of the video clip corresponding to the sliding window; and
extracting one or more target video clips from the multiple video clips based on the scores of the multiple video clips.

6. The method of claim 1, wherein the N video frames are obtained by sampling the video through a preset time ladder, or by sampling the video through a designated preset number of video frames.

7. A device for video clip extraction, comprising:
a processor; and
a memory for storing instructions executable by the processor;
wherein the processor is configured to:
obtain a video and sample the video to obtain N video frames, wherein N is a positive integer;
input the N video frames to a pre-trained frame feature extraction model to obtain a feature vector of each video frame in the N video frames;
determine scores of the N video frames based on the a pre-trained scoring model, wherein for an i-th frame in the N video frames, feature vectors of K video frames centered on the i-th frame are input to the pre-trained scoring model, to obtain a score of the i-th frame, wherein i is a positive integer less than or equal to N, and K is a positive integer; and
extract target video clips from the video based on the scores of the N video frames:,
wherein the processor is further configured to: determine training data to train the pre- trained scoring model based on data pairs composed of first clips and second clips via a multi- frame fusion layer;
wherein the data pairs are obtained by:
obtaining a sample video comprising one or more of labeled video clips and unlabeled video clips, wherein each labeled video clip is labeled with a target attribute for characterizing the target video clip, or a non-target attribute for characterizing the non-target video clip; and
obtaining the data pairs composed of first clips and second clips, based on the target attributes, the non-target attributes and the unlabeled video clips.

8. The device of claim 7, wherein
the multi-frame fusion layer is configured to fuse the feature vectors of K video frames into a fixed-length vector.

9. The device of claim 8, wherein the processor is further configured to:
sample K first video frames in the first clip, extract first feature vectors of the K first video frames based on the frame feature extraction model, and sample K second video frames in the second clip, extract second feature vectors of the K second video frames based on the frame feature extraction model,
fuse the first feature vectors of K first video frames to a fixed-length first clip feature vector based on the multi-frame fusion layer, and fuse the second feature vectors of K second video frames to a fixed-length second clip feature vector based on the multi-frame fusion layer; and
input the fixed-length first clip feature vector and the fixed-length second clip feature vector to a twin neural network, to obtain the score of the first clip and the score of the second clip, and perform back propagation with a ranking loss to obtain a trained twin neural network; wherein the twin neural network comprises two multi-layer perceptron models with shared parameters;
the scoring model being a multi-layer perceptron model of the trained twin neural network.

10. The device of claim 7, wherein the processor is further configured to:
when the labelled sample video clips are first labelled video clips with the target, determine the first labeled video clips as first clips, extract a part of video clips from the unlabeled video clips as second clips, and obtain one or more data pairs from the first clips and the second clips; or
when the labelled sample video clips are second labeled video clips with the non-target attributes, determine the second labeled video clips as second clips, extract a part of video clips from the unlabeled video clips as first clips, and obtain one or more data pairs from the first clips and the second clips; or
when the labelled video clip comprise first labelled video clips with the target attributes and second labeled video clips with the non-target attributes, determine the first labelled video clips as first clips, determine the second labeled video clips as second clips, extract a part of video clips from the unlabeled video clips, obtain data pairs from the first clips and the second clips, obtain data pairs from the first clips and the part of video clips, and obtain data pairs from the second clips and the part of video clips.

11. The device of claim 7, wherein the processor is further configured to:

obtain multiple video clips by sliding a fixed-length sliding window along a time sequence on the video, wherein each sliding window corresponds to a video clip;

for each sliding window, determine an average score of video frames included in each sliding window, and determine the average score of the video frames as a score of the video clip corresponding to the sliding window; and extract one or more target video clips from the multiple video clips based on the scores of the multiple video clips.

12. The device of claim 7, wherein the N video frames are obtained by sampling the video through a preset time ladder, or by sampling the video through a designated preset number of video frames.

13. A non-transitory computer-readable storage medium having instructions stored thereon, when the instructions are executed by a processor, a method for video clip exaction is executed, the method comprising:

obtaining a video, and sampling the video to obtain N video frames, wherein N is a positive integer;

inputting the N video frames to a pre-trained frame feature extraction model to obtain a feature vector of each video frame in the N video frames;

determining scores of the N video frames based on the a pre-trained scoring model, wherein, for an i-th frame in the N video frames, feature vectors of K video frames centered on the i-th frame are input to the pre-trained scoring model, to obtain a score of the i-th frame, wherein i is a positive integer less than or equal to N, and the K is a positive integer; and extracting target video clips from the video based on the scores of the N video frames:,.

wherein the method further comprises: determining training data to train the pre-trained scoring model based on data pairs composed of first clips and second clips via a multi-frame fusion layer;

wherein the data pairs are obtained by:

obtaining a sample video comprising one or more of labeled video clips and unlabeled video clips, wherein each labeled video clip is labeled with a target attribute for characterizing the target video clip, or a non-target attribute for characterizing the non-target video clip; and obtaining the data pairs composed of first clips and second clips, based on the target attributes, the non-target attributes and the unlabeled video clips.

14. The storage medium of claim 13, wherein the multi-frame fusion layer is configured to fuse feature vectors of K video frames into a fixed-length vector.

15. The storage medium of claim 14, wherein the scoring model is obtained by:

sampling K first video frames in the first clip, extracting first feature vectors of the K first video frames based on the frame feature extraction model, and sampling K second video frames in the second clip, extracting second feature vectors of the K second video frames based on the frame feature extraction model, fusing the first feature vectors of K first video frames to a fixed-length first clip feature vector based on the multi-frame fusion layer, and fusing the second feature vectors of K second video frames to a fixed-length second clip feature vector based on the multi-frame fusion layer; and inputting the fixed-length first clip feature vector and the fixed-length second clip feature vector to a twin neural network, to obtain the score of the first clip and the score of the second clip, and performing back propagation with a ranking loss to obtain a trained twin neural network; wherein the twin neural network comprises two multi-layer perceptron models with shared parameters; the scoring model being a multi-layer perceptron model of the trained twin neural network.

16. The storage medium of claim 13, wherein obtaining the data pairs composed of first clips and second clips based on the target attributes, the non-target attributes and the unlabeled video clips comprises:

when the labelled sample video clips are first labelled video clips with the target attributes, determining the first labeled video clips as first clips, extracting a part of video clips from the unlabeled video clips as second clips, and obtaining one or more data pairs from the first clips and the second clips; or when the labelled sample video clips are second labeled video clips with the non-target attributes, determining the second labeled video clips as second clips, extracting a part of video clips from the unlabeled video clips as first clips, and obtaining one or more data pairs from the first clips and the second clips; or when the labelled video clips comprise first labelled video clips with the target attributes and second labeled video clips with the non-target attributes, determining the first labelled video clips as first clips, determining the second labeled video clips as second clips, extracting a part of video clips from the unlabeled video clips, obtaining data pairs from the first clips and the second clips, obtaining data pairs from the first clips and the part of video clips, and obtaining data pairs from the second clips and the part of video clips.

17. The storage medium of claim 13, wherein extracting target video clips from the video based on the scores of the N video frames comprises:

obtaining multiple video clips by sliding a fixed-length sliding window along a time sequence on the video, wherein each sliding window corresponds to a video clip;

for each sliding window, determining an average score of video frames included in each sliding window, and determining the average score of the video frames as a score of the video clip corresponding to the sliding window; and extracting one or more target video clips from the multiple video clips based on the scores of the multiple video clips.

* * * * *